(12) United States Patent
Kim et al.

(10) Patent No.: US 6,961,192 B2
(45) Date of Patent: Nov. 1, 2005

(54) COLOR LIGHTING APPARATUS AND METHOD AND IMAGE PROJECTION APPARATUS AND METHOD USING THE SAME

(75) Inventors: Sung-Ha Kim, Seoul (KR); Kun Ho Cho, Gyeonggi do (KR); Dae-sik Kim, Gyeonggi-do (KR); Hee-jong Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/720,340

(22) Filed: Nov. 25, 2003

(65) Prior Publication Data

US 2004/0105077 A1 Jun. 3, 2004

(30) Foreign Application Priority Data

Nov. 26, 2002 (KR) ................... 10-2002-0074109

(51) Int. Cl.$^7$ .......................... G02B 7/02; G02B 27/10
(52) U.S. Cl. .................. 359/822; 814/813; 814/619
(58) Field of Search ................... 359/634, 308, 359/31, 34, 99, 102, 821, 822, 619; 362/268, 293; 743/743; 349/5, 7, 8; 348/743; 353/31, 34, 84, 98, 99, 102

(56) References Cited

U.S. PATENT DOCUMENTS

| 6,050,689 A | 4/2000 | Makamura et al. |
| 6,332,684 B1 | 12/2001 | Shibatani et al. |
| 6,811,263 B2 * | 11/2004 | Kim et al. ............... 353/31 |
| 6,824,270 B2 * | 11/2004 | Kim et al. ............... 353/31 |
| 2002/0027642 A1 * | 3/2002 | Nishida et al. ............. 353/53 |
| 2002/0048000 A1 * | 4/2002 | Nishida et al. ............. 353/98 |
| 2003/0072084 A1 * | 4/2003 | Ouchi ....................... 359/634 |
| 2004/0057018 A1 * | 3/2004 | Cho et al. ................. 353/31 |
| 2004/0233342 A1 * | 11/2004 | Kim et al. ................. 349/6 |
| 2004/0246445 A1 * | 12/2004 | Cho et al. ................. 353/31 |
| 2004/0246590 A1 * | 12/2004 | Ouchi ....................... 359/634 |
| 2004/0257387 A1 * | 12/2004 | Cho et al. ................. 345/690 |
| 2004/0263793 A1 * | 12/2004 | Kim et al. ................. 353/33 |

FOREIGN PATENT DOCUMENTS

| EP | 1 253 787 | 10/2002 |
| WO | 00/60397 | 10/2000 |

* cited by examiner

*Primary Examiner*—Ricky L. Mack
(74) *Attorney, Agent, or Firm*—Staas & Halsey LLP

(57) ABSTRACT

A color lighting apparatus and method which has a small optical apparatus or method illuminating color beams with a high optical efficiency and an image projection apparatus and method using the same. The color lighting apparatus includes a light source, a color beam separating unit for separating incident light according to predetermined wavelength bands, a first condensing lens which condenses the light separated by the color beam separating unit, and a scrolling unit which changes the travel paths of beams separated according to the predetermined wavelength bands, forms color bars at different locations, and scrolls the incident light so as to periodically scroll the color bars. The image projection apparatus includes the color lighting apparatus, a second condensing lens which again focuses incident light, a uniform light forming unit which makes light passing through a scrolling unit into uniform light, an image forming device which forms an image from the light passing through the uniform light forming unit, and a projection lens unit which magnifies and projects the image produced form the image forming device onto a screen.

27 Claims, 11 Drawing Sheets

COLOR LIGHTING APPARATUS AND METHOD AND IMAGE PROJECTION APPARATUS AND METHOD USING THE SAME

CROSS-REFERENCE TO RELATED APPLICATIONS

This application claims the priority of Korean Patent Application No. 2002-74109, filed on Nov. 26, 2002, in the Korean Intellectual Property Office, the disclosure of which is incorporated herein in its entirety by reference.

BACKGROUND OF THE INVENTION

1. Field of the Invention

The present invention relates to a color lighting apparatus and method for illuminating color beams by separating white light emitted from a light source into several color beams and an image projection method and apparatus using the same. More particularly, the present invention relates to a small optical color lighting apparatus and method for illuminating color beams having high optical efficiency, and an image projection apparatus and method using the same.

2. Description of the Related Art

Generally, image projection systems provide images by projecting an image using a micro display, such as a liquid crystal display or a digital micromirror display, on a screen using a light source.

The image projection systems are classified into single-panel image projection systems and 3-panel image projection systems, according to the number of micro displays. The 3-panel image projection systems include three micro displays which are disposed on optical paths of separated red, blue, and green beams, respectively. Thus, the 3-panel image projection system has a higher optical efficiency than a single-panel image projection system, but its optical structure is more complicated, resulting in higher manufacturing costs.

Meanwhile, general single-panel image projection systems periodically separate white light emitted from a light source into red, blue, and green beams using a color wheel filter. The single-panel image projection systems have a more simpler optical structure than the 3-panel image projection systems, but have ⅔ more light loss than the 3-panel image projection systems due to the use of the color wheel filter, resulting in a reduced optical efficiency. A conventional image projection system, which uses a single-panel image projection system but solves the problem of the low optical efficiency, is illustrated in FIG. 1.

As illustrated in FIG. 1, the conventional single-panel image projection system includes a light source 11 for generating and irradiating non-polarized white light. The irradiated white light is converted into uniform light after passing through a fly eye lens array 13, which transforms incident light into uniform light by mixing the incident light, and then proceeds to a polarizing converter 15. The polarizing converter 15 changes the polarization of the non-polarized white light, irradiated from the light source 11, so that the non-polarized white light has a single polarization direction. The white light passed through the polarizing converter 15 is separated into red (R), green (G), and blue (B) beams by passing through first and second dichroic mirrors 17 and 19. Specifically, the first dichroic mirror 17 reflects only a color beam in the blue wavelength spectrum of the incident white light and transmits all other color beams. Next, the second dichroic mirror 19 separates the transmitted color beams into red and green beams, and similarly only transmits one of the colors.

First, second, and third scanning prisms 21, 23 and 25, for periodically scrolling incident light, are disposed along the respective optical paths of the separated R, G, and B beams. The first, second, and third scanning prisms 21, 23, and 25 may be square pillar-shaped prisms and rotatably driven by a driving unit (not shown). Angles between optical axes on the optical paths of the R, G, and B beams and sidewalls of the prisms 21, 23 and 25, change due to the rotatable drive of the first, second, and third scanning prisms 21, 23, and 25 so that the travel path of the beams passing through the prisms 21, 23, and 25 changes periodically.

Here, the initial angles of the first, second, and third scanning prisms 21, 23, and 25 are set such that the light passing through the prisms 21, 23, and 25 separates an effective image area of a display device 33 into three areas. Light passing through the prisms 21, 23 and 25 is then irradiated onto the three effective image areas, when the first, second, and third scanning prisms 21, 23 and 25 are rotatably driven along the optical paths of the R, G, and B beams. Thus, as illustrated in FIG. 2, the beams are focused onto the separated three areas while repeating a (B, R, G), (G, B, R), and (R, G, B) ordering according to the driven state of the prisms 21, 23 and 25.

The ordered beams exiting the first, second, and third scanning prisms 21, 23, and 25 are combined after passing though third and fourth dichroic mirrors 27 and 29. Here, reflecting mirrors 18 and 20, for changing the travel path of light, are disposed between the first and third dichroic mirrors 17 and 27 and between the second and fourth dichroic mirrors 19 and 29, respectively.

The scrolled light passing through the fourth dichroic mirror 29 is incident on a polarized beam splitter 31, which transmits or reflects incident light according to its polarization direction. As illustrated in FIG. 2, light reflected from the polarized beam splitter 31 is scrolled periodically and incident on the display device 33. The display device 33 forms an image from the incident light. Here, the image is produced by changing the polarization direction of the incident light on each pixel.

That is, only incident light whose polarization direction changes can pass through the polarized beam splitter 31 and proceed to a projection lens unit 35. The image incident on the projection lens unit 35 is then magnified and projected onto a screen 50.

The image projection system also includes a plurality of relay lenses 41, 42, 43, 44, 45, 46, 47 and 48 which are disposed along the optical path of light and transfer the incident light irradiated from the light source 11 to the display device 33.

Although only one display device is used in the conventional image projection system having the above structure, the optical structure of the image projection system is very complicated. Further, since the three scanning prisms rotate and scroll light independently, it is difficult to synchronize the image projection system with the display device.

SUMMARY OF THE INVENTION

Therefore, the present invention provides a color lighting apparatus and method that has a simple optical structure and illuminates scrolled color beams.

The present invention also provided a single panel image projection apparatus and method that includes a simple optical structure and is easily synchronized with the driving of a display device.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a color lighting system, including a light source to emit light, a color beam separator separating incident light emitted from the light source according to predetermined wavelength bands and transmitting the separated beams at different angles, a first condensing lens condensing the separated beams, and a scrolling unit changing travel paths of the condensed beams in color bars at different locations, and scrolling the changing of the travel paths of the condensed beams so as to periodically scroll the color bars.

The color beam separator, may include a first dichroic mirror, inclined to the optical axis of light incident to the color beam separator, reflecting a first color beam of the incident light and transmitting the remaining color beams, a second dichroic mirror, inclined to the optical axis of the incident light and disposed behind a back surface of the first dichroic mirror, reflecting a second color beam of the color beams transmitted by the first dichroic mirror, and transmitting the remaining color beam, and a third dichroic mirror, inclined to the optical axis of the incident light and disposed behind a back surface of the second dichroic mirror, and reflecting a third color beam of the color beams transmitted by the second dichroic mirror.

To accomplish the above and/or other aspects and advantages, embodiments of the present invention provide an image projection system, including a light source emitting light, a color beam separator separating incident light beams, emitted from the light source, according to predetermined wavelength bands and transmitting the separated beam at different angles, a first condensing lens condensing the separated beams, a scrolling unit changing travel paths of the condensed beams to form color bars at different locations and scrolling the changing of the travel paths of the condensed beams so as to periodically scroll the color bars, a second condensing lens condensing light exiting the scrolling unit, a uniform light forming unit transforming the light exiting the scrolling unit into uniform light, an image forming device forming an image from light exiting the uniform light forming unit, and a projection lens unit magnifying and projecting the image produced from the image forming device onto a screen.

The color beam separator may include a first dichroic mirror, inclined to an optical axis of light incident on the color beam separator, reflecting a first color beam of the incident light and transmitting the remaining color beams, a second dichroic mirror, inclined to the optical axis of the incident light and disposed behind a back surface of the first dichroic mirror, reflecting a second color beam of the color beams transmitted by the first dichroic mirror and transmitting the remaining color beam, and a third dichroic mirror, inclined to the optical axis of the incident light and disposed behind a back surface of the second dichroic mirror, reflecting a third color beam of the color beams transmitted by the second dichroic mirror.

To accomplish the above and/or other aspects and advantages, embodiments of the present invention include a color lighting method, including separating incident light according to predetermined wavelength bands, transmitting the separated beams at different angles to a condensing unit, condensing the transmitted beams using the condensing unit, changing travel paths of the transmitted beams to generate color bars, and scrolling the changing of the travel paths of the condensed beams so as to periodically scroll the color bars.

The color lighting method may further include condensing the changed travel path condensed beams, forming an image using the condensed changed travel path condensed beams, and projecting the formed image onto a screen.

Additionally, the separating of the incident light may include reflecting a first color beam, of the incident light, at a first angle and transmitting the remaining color beams incident on the color beam separator to the condensing unit, reflecting a second color beam, of the remaining color beams, at a second angle and transmitting color beams remaining after the second reflection to the condensing unit, and reflecting a third color beam, of the beams remaining after the second reflection, at a third angle and transmitting color beams remaining after the third reflection to the condensing unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
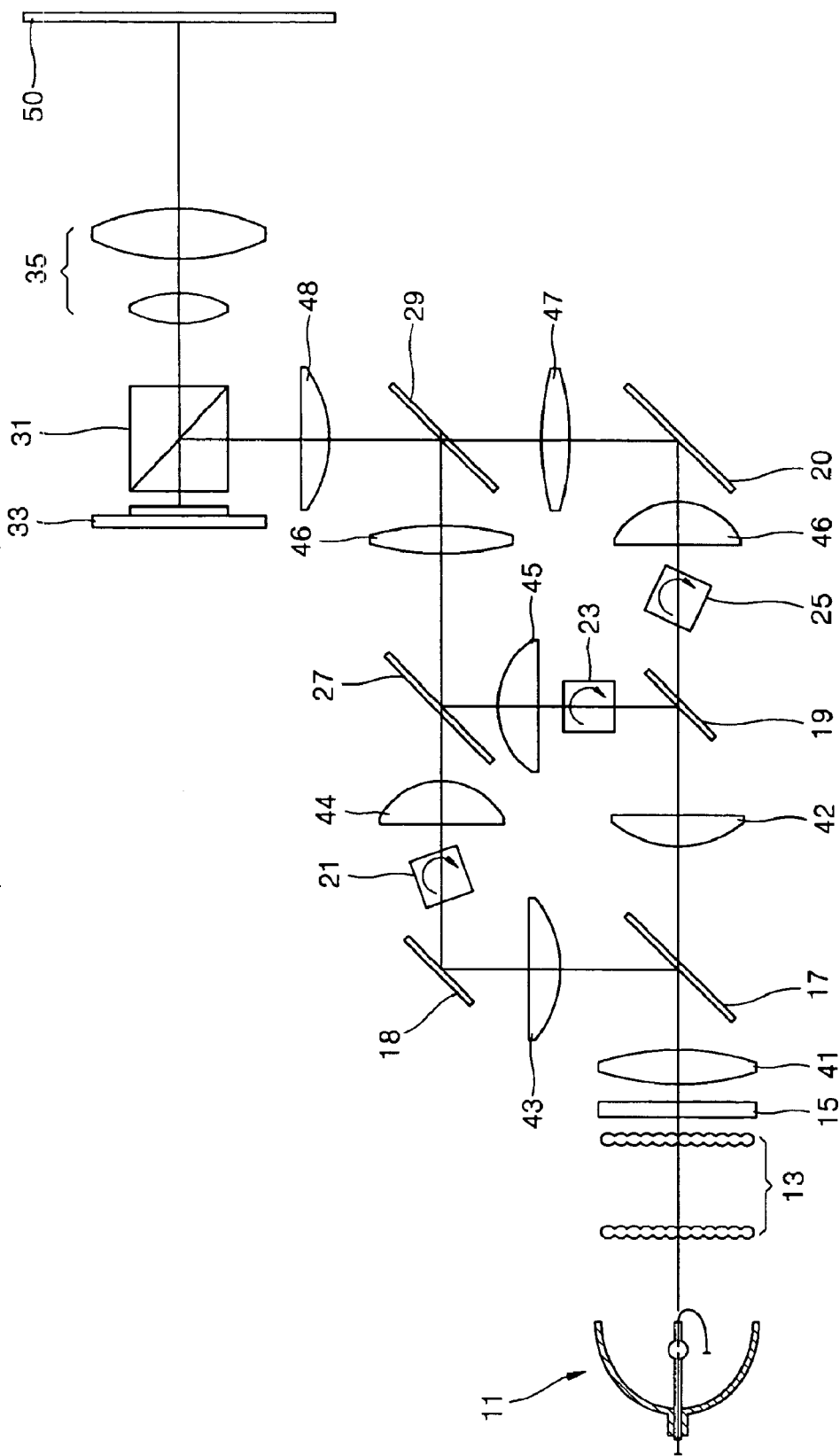
FIG. 1 schematically illustrates an optical arrangement of a single-panel image projection system using a conventional color lighting system.
Figure 2:
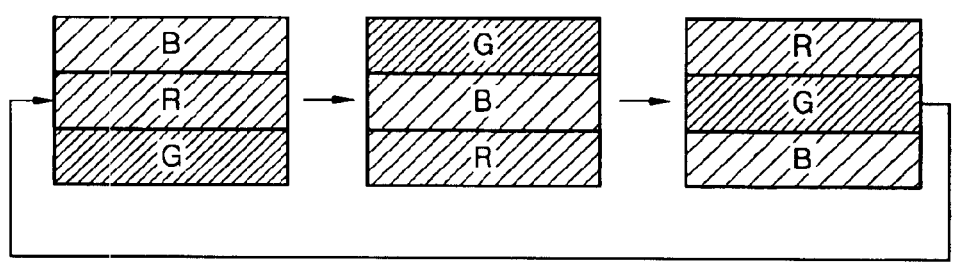
FIG. 2 illustrates changes in disposition of color beams separated by the driving scanning prisms of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
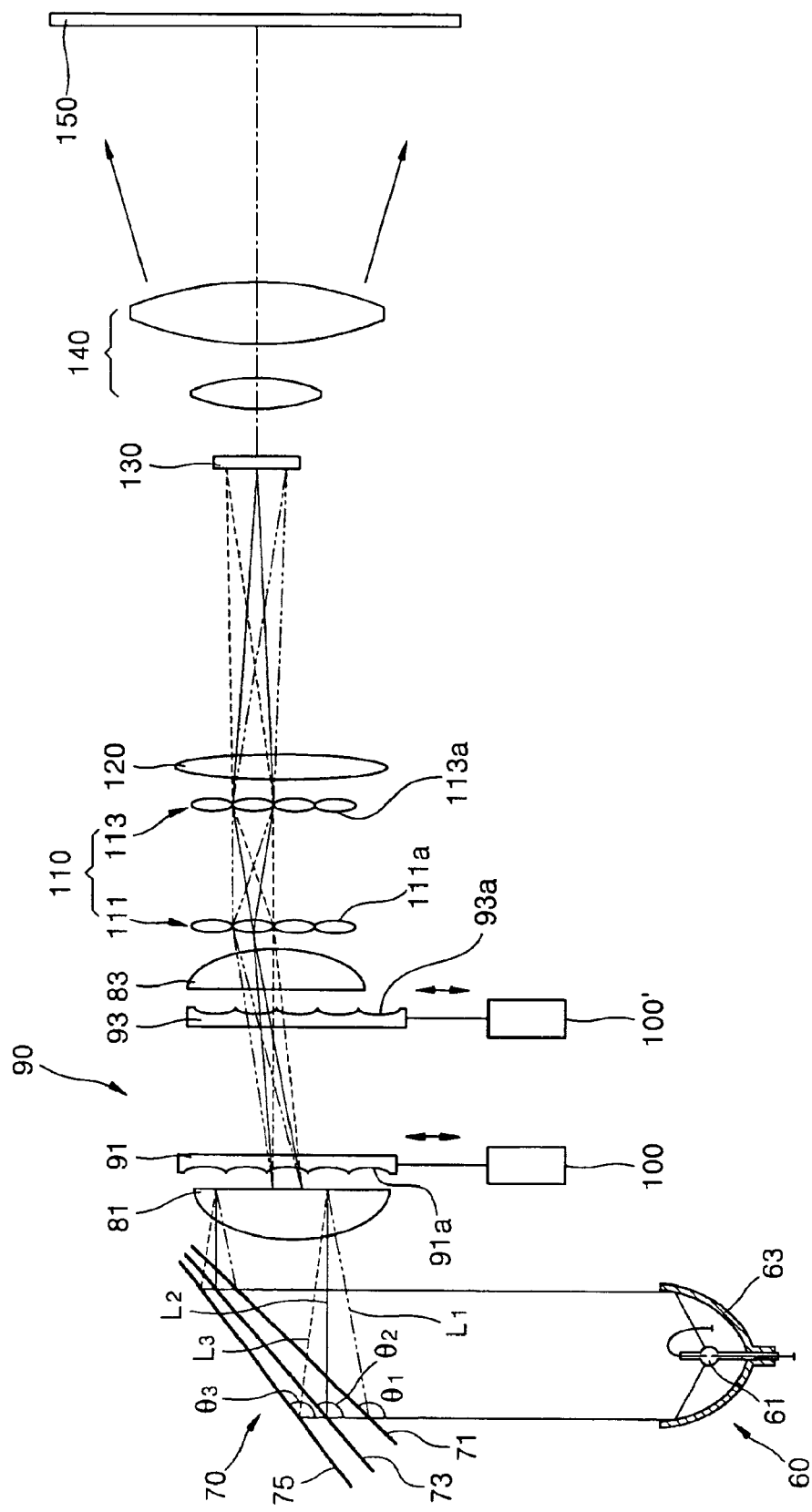
FIG. 3 schematically illustrates an optical arrangement of a color lighting apparatus and method and an image projection apparatus and method using the same, according to an embodiment of the present invention.

FIG. 3 illustrates a color lighting apparatus according to an embodiment of the present invention, including a light source 60, a color beam separating unit 70, separating incident light emitted from the light source 60 according to a predetermined wavelength band, a first condensing lens 81, condensing color beams separated by the color beam separating unit 70, and a scrolling unit 90. The scrolling unit 90 changes the travel paths of the color beams separated according to the predetermined wavelength bands, forms color bars on different locations, and scrolls the incident light so as to periodically scroll the color bars.

The light source 60, generating and irradiating white light, includes a lamp 61 generating light and a reflecting mirror 63 reflecting the light emitted from the lamp 61 and guiding the travel path of the reflected light. The reflecting mirror 63 may be an elliptical mirror, where the position of the lamp 61 is a first focal point and the point where light is focused is a second focal point. Alternatively, the reflecting mirror 63 may be a parabolic mirror where the position of the lamp 61 is a focal point and the parabolic mirror collimates the light emitted from the lamp 61. In FIG. 3, the reflecting mirror 63 is a parabolic mirror.

The color beam separating unit 70 separates the light emitted from the lamp 61 according to predetermined wavelength bands, and transmits the separated color beams at different angles. For this, the color beam separating unit 70 includes first, second, and third dichroic mirrors 71, 73, and 75 which each reflect light having a specific wavelength band, and separate the incident light into first, second, and third color beams L1, L2, and L3. The separated first, second, and third color beams L1, L2, and L3 proceed to the first condensing lens 81 at respectively different angles of θ1, θ2, and θ3 between optical axes of the respective color beams L1, L2, and L3 and the respective dichroic mirrors 71, 73, and 75.

Specifically, the first dichroic mirror 71 is inclined at the angle of θ1 to the optical axis of the incident light in a travelling direction of the light reflected from the reflecting mirror 63, reflects the first color beam L1, e.g., a blue beam of the incident light, and transmits color beams other than the blue beam. The second dichroic mirror 73 is inclined at the angle of θ2 to the optical axis of the incident light in a travelling direction of the light reflected from the reflecting mirror 63, is disposed on a back surface of the first dichroic mirror 71, reflects the second color beam L2, e.g., a red beam of the incident light, and transmits the remaining color beam. Similarly, the third dichroic mirror 75 is inclined at the angle of θ3 to the optical axis of the incident light in a travelling direction of the light reflected from the reflecting mirror 63, is disposed in a back surface of the second dichroic mirror 73, and reflects the third color beam L3, e.g., a green beam of the incident light. Here, the third dichroic mirror 75 may also be a total reflection mirror that can reflect all of the color beams.

Meanwhile, θ1, θ2, and θ3 are obtuse angles and satisfy the following formula 1 so as to line up the optical axes of the first, second, and third color beams L1, L2, and L3, reflected from the first, second, and third dichroic mirrors 71, 73, and 75, onto the first condensing lens 81.

$$\theta_1 > \theta_2 > \theta_3 \qquad (1)$$

The first, second, and third dichroic mirrors 71, 73, and 75 may be disposed to reflect other color beams in addition to the one color beam, wherein each of the mirrors 71, 73, and 75 can reflect individually. Further, since a method for manufacturing the first, second, and third dichroic mirrors 71, 73, and 75 is known to those of ordinary skill in the field of applied optics, a description thereof will be omitted.

The first condensing lens 81 focuses the color beams separated form the first, second, and third dichroic mirrors 71, 73, and 75. To do so, it is preferable that the first condensing lens 81 is a cylindrical lens selectively focusing incident light, incident on the condensing lens 81, only along particular incidence paths. The shape of the first focusing lens 81 also is substantially the same as that of a focusing lens indicated as reference numeral 81 in FIG. 10.

It is possible that the first condensing lens 81 is a refraction optical element having a predetermined refraction pattern on a flat panel, selectively focusing incident light, incident on the condensing lens 81, only along particular incidence paths, as referenced above. Since the structure and a manufacturing method of a lens for converging or diverging the incident light according to a refraction pattern are widely known, their description will also be omitted.

The scrolling unit 90 includes a first cylindrical array lens 91 and a first driving unit 100. The first cylindrical array lens 91 includes a plurality of cylindrical lenses 91a which have the same index of refraction and are adjacently disposed. Here, the plurality of cylindrical lenses 91a independently converge or diverge incident light. For example, the concave cylindrical lenses 91a, for diverging incident light, are illustrated in FIG. 3. The cylindrical lenses 91a may also form refractive patterns on the flat panel.

It is preferable that the scrolling unit 90 further includes a second cylindrical array lens 93 and a second driving unit 100', for driving the second cylindrical array lens 93. The second cylindrical array lens 93 scrolls the light passing through the first cylindrical array lens 91 and is disposed along the optical path of the first cylindrical array lens 91. The second cylindrical array lens 93 includes a plurality of cylindrical array lens 91. The second cylindrical array lens 93 includes a plurality of cylindrical lenses 93a which have the same index of refraction and are adjacently disposed, as in the first cylindrical array lens 91. Here, the plurality of cylindrical lenses 93a independently converges or diverges incident light. The cylindrical lenses 93a may also be concave for diverging incident light, or of a certain shape that can converge or diverge the incident light by forming a refractive pattern on the flat panel.

The first and second driving units 100 and 100' provide a driving force for reciprocatingly-driving the first and second cylindrical array lenses 91 and 93 in a direction perpendicular to the optical axis of the incident light.

Figure 4:
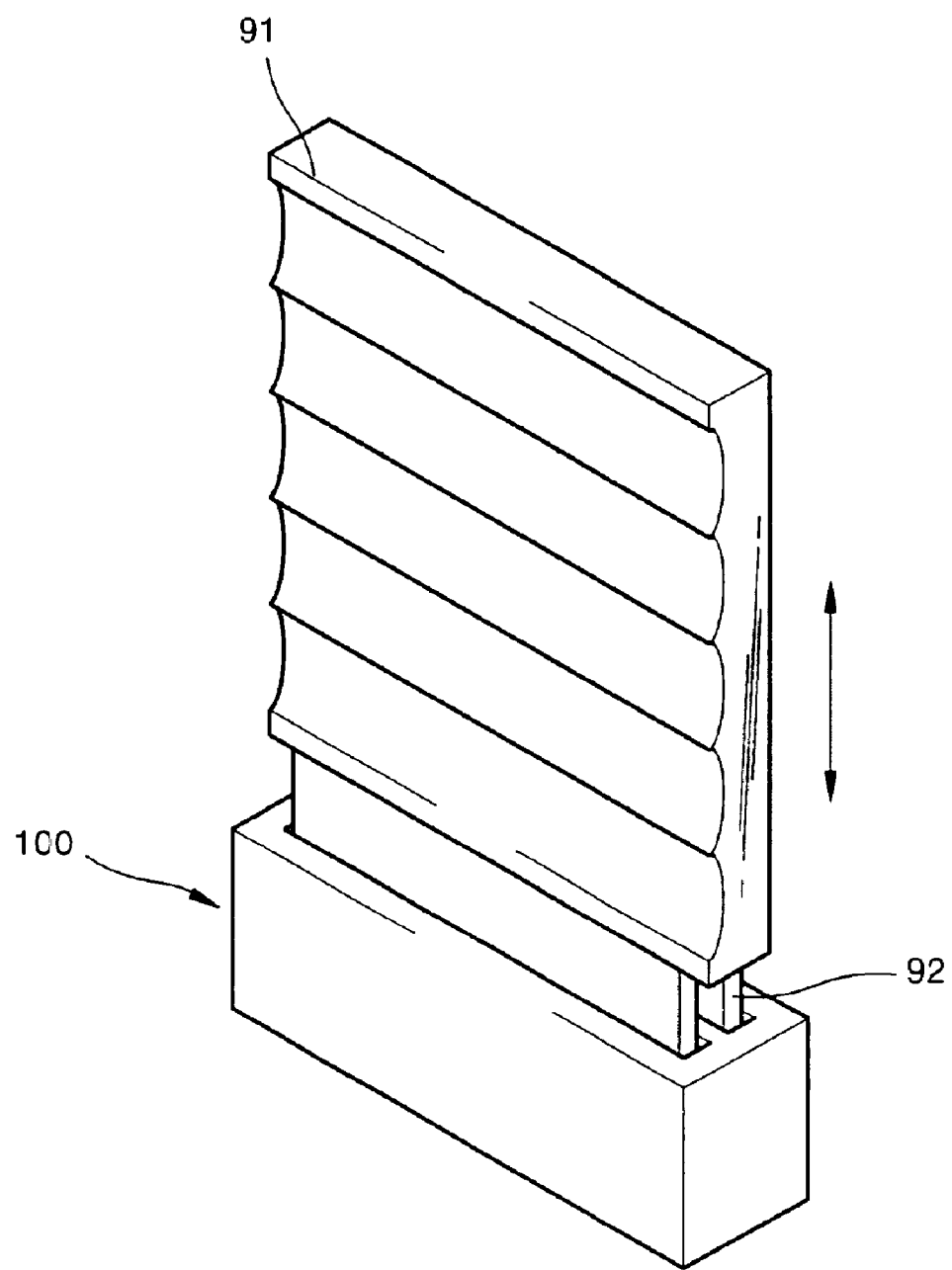
FIG. 4 is a perspective view of a cylindrical array lens and a driving unit of the scrolling unit of FIG. 3, according to an embodiment of the present invention.
Figure 5:
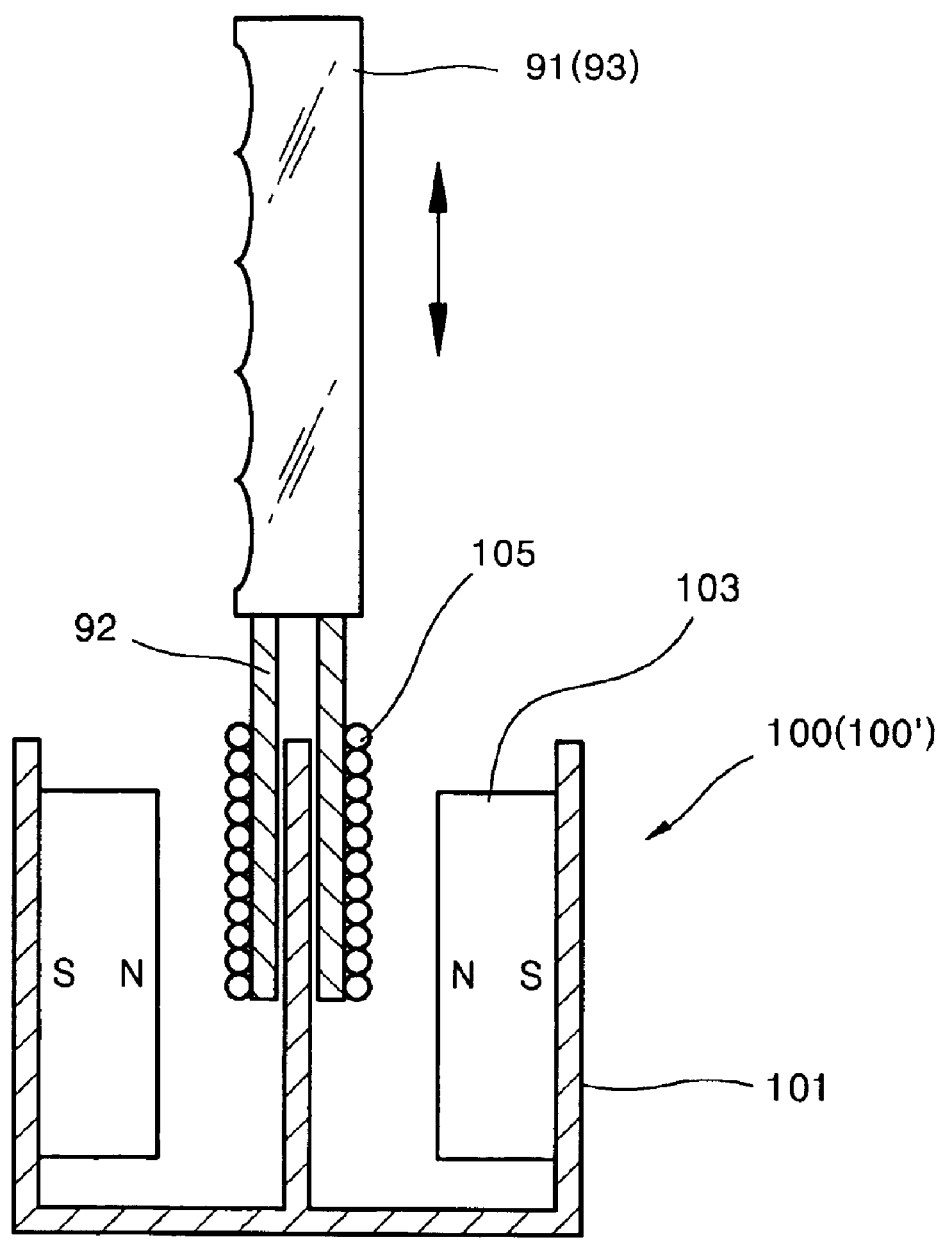
FIG. 5 is a cross-sectional view of FIG. 4.

Referring to FIGS. 4 and 5, the first and second driving units 100 and 100' reciprocatingly-drive the first and second cylindrical array lenses 91 and 93 in up and down directions as shown in FIGS. 4 and 5. Each of the first and second driving units 100 and 100' includes a yoke member 101, illustrated in FIG. 5, where an inside yoke and an outside yoke are integrally formed to generate a magnetic path, a magnet 103 provided within the outside yoke of the yoke member 101, and a coil member 105, opposite to the magnet 103 and wound around a bobbin 92 extended from the first and second cylindrical array lenses 91 and 93. Here, the direction of magnetic force lines of the magnet 103 and the direction in which the coil member 105 is wound are determined such that an electromagnetic force between the coil member 105 and the magnet 103 is in the up and down direction, as illustrated in FIGS. 4 and 5.

Since the first and second driving units 100 and 100' independently drive the first and second cylindrical array lenses 91 and 93, light passing through the first and second cylindrical array lenses 91 and 93 is separated into three areas, at an effective image area, of the image forming device 130. Accordingly, color bars are formed in the separated areas and are then scrolled. Thus, the color bars are formed at a forming position of an image forming device 130, which will be described in more detail below. Beams having first, second, and third wavelength bands, that is, red (R), green (G), and blue (B) wavelength bands, are alternatively incident on the separated three areas. For example, the R, G, and B beams are alternatively focused in a (G, R, B), (R, B, G), and (B, G, R) ordering. The first and second driving units 100 and 100' may be a voice coil motor or a piezo driving unit.

The color lighting apparatus, according to this embodiment of the present invention, may further include a second condensing lens 83, a uniform light forming unit 110, and a relay lens 120 for transferring the light to a predetermined position without changing the size of the light, in consideration of the focal point and uniformity of the light passing through the scrolling unit 90.

The second condensing lens 83 further condenses the light passing through the scrolling unit 90. It is preferable that the second condensing lens 83 is a cylindrical lens for selectively focusing light incident on the condensing lens 81, only along particular incidence paths. Further, it is possible that the second condensing lens 83 is a diffraction optical element having a diffraction pattern, on a flat panel, so as to selectively focusing light on the condensing lens 81, only along particular incidence paths, as described above.

The uniform light forming unit 110 is disposed on an optical path between the second condensing lens 83 and the relay lens 120 and transforms the light passing through the scrolling unit 90 into uniform light. For this, the uniform light forming unit 110 includes a first fly eye lens 111 having a plurality of convex portions 111a which are two-dimensionally arranged on an incident surface and/or an emitting surface of the incident light, and a second fly eye lens 113 which is disposed adjacent to the first fly eye lens 111 and has a plurality of convex portions 113a which are two-dimensionally arranged on the incident surface and/or the emitting surface.

The uniform light forming unit 110 may include another optical element such as a glass rod, as well as the first and second fly eye lenses 111 and 113. The relay lens 120 transfers the light passing through the uniform light forming unit 110 to a predetermined position, for example, the forming position of the image forming device 130.

Figure 6:
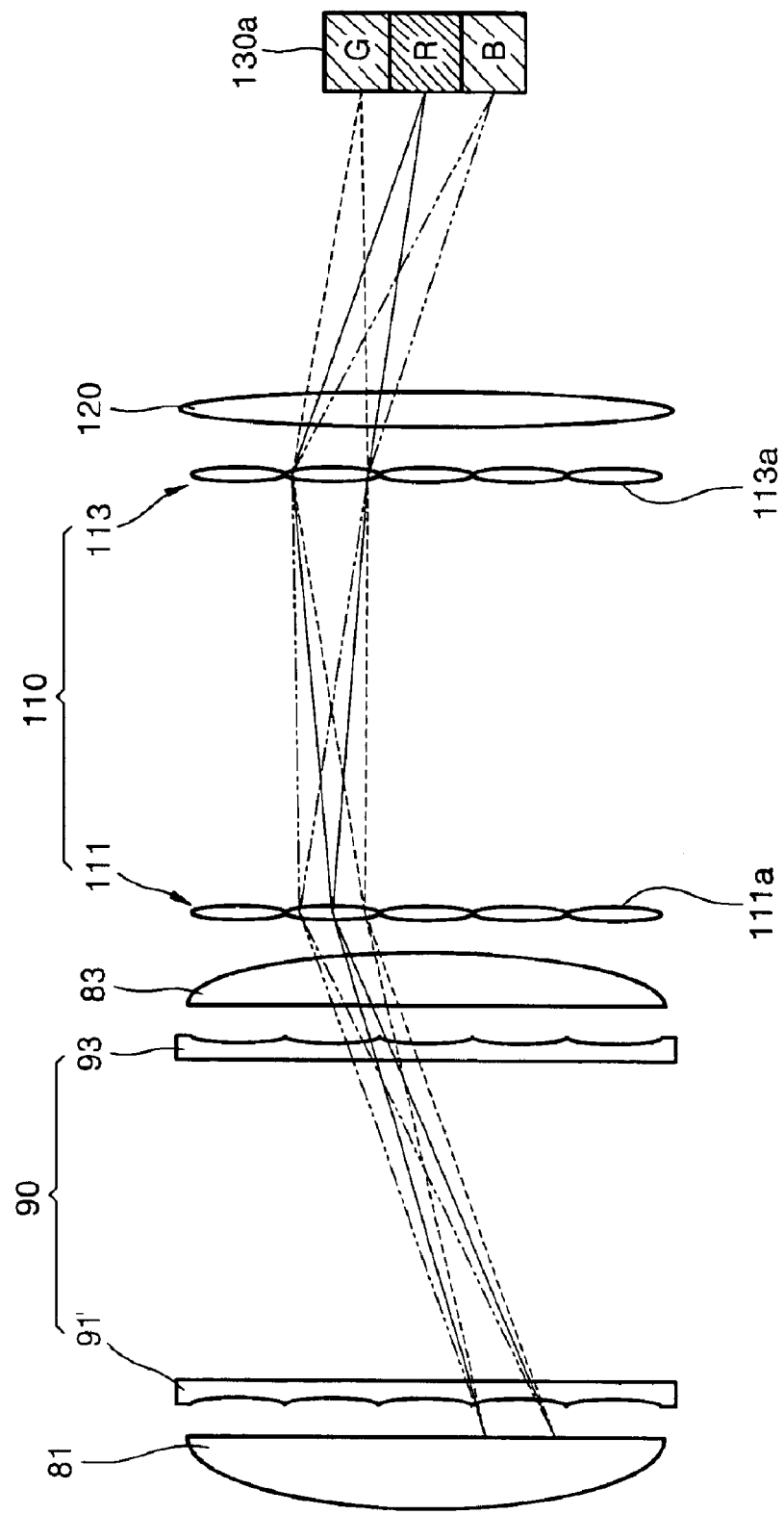
FIGS. 6 through 8 are views for schematically explaining operations of the color lighting apparatus and method illustrated in FIG. 3.
Figure 7:
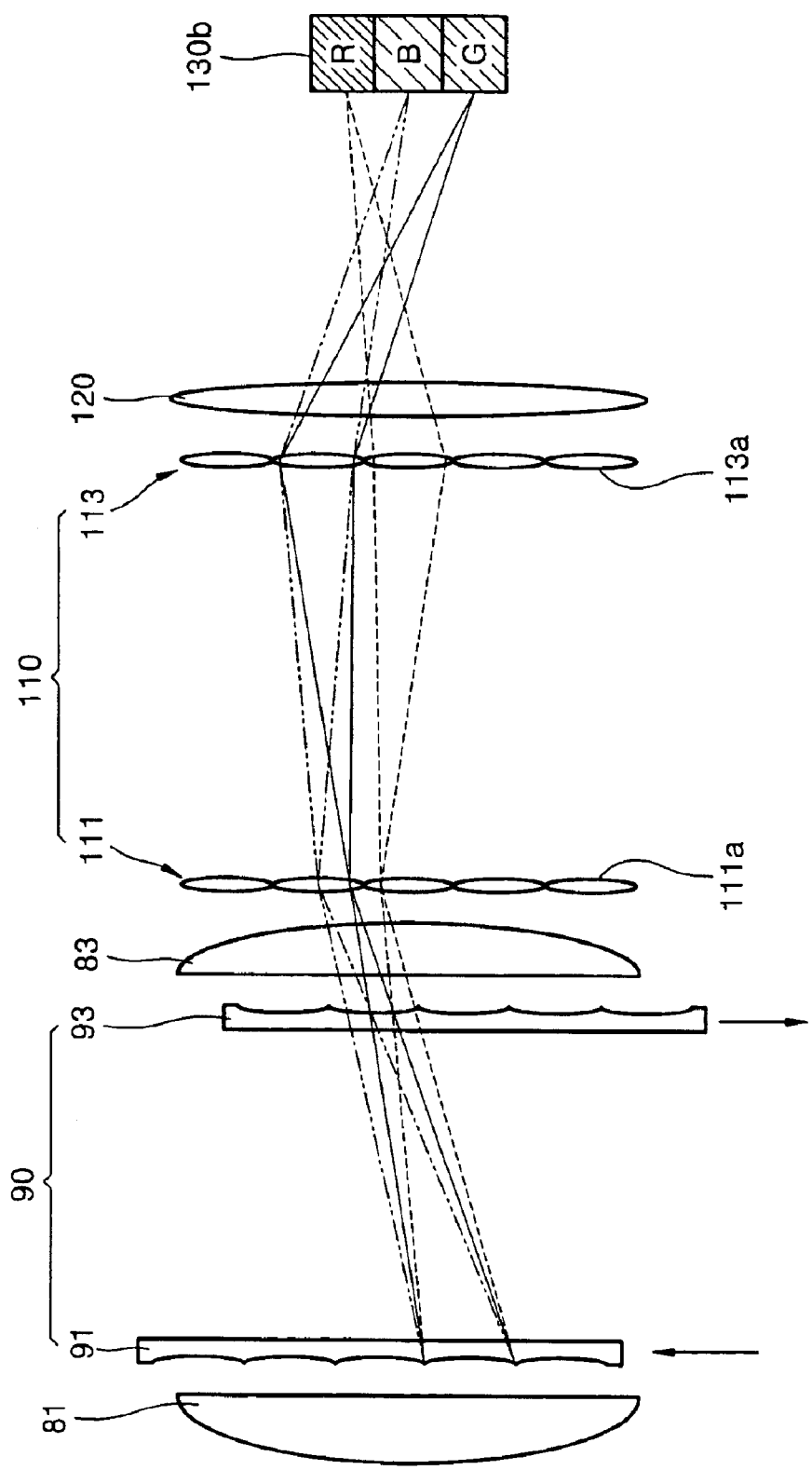
Figure 8:
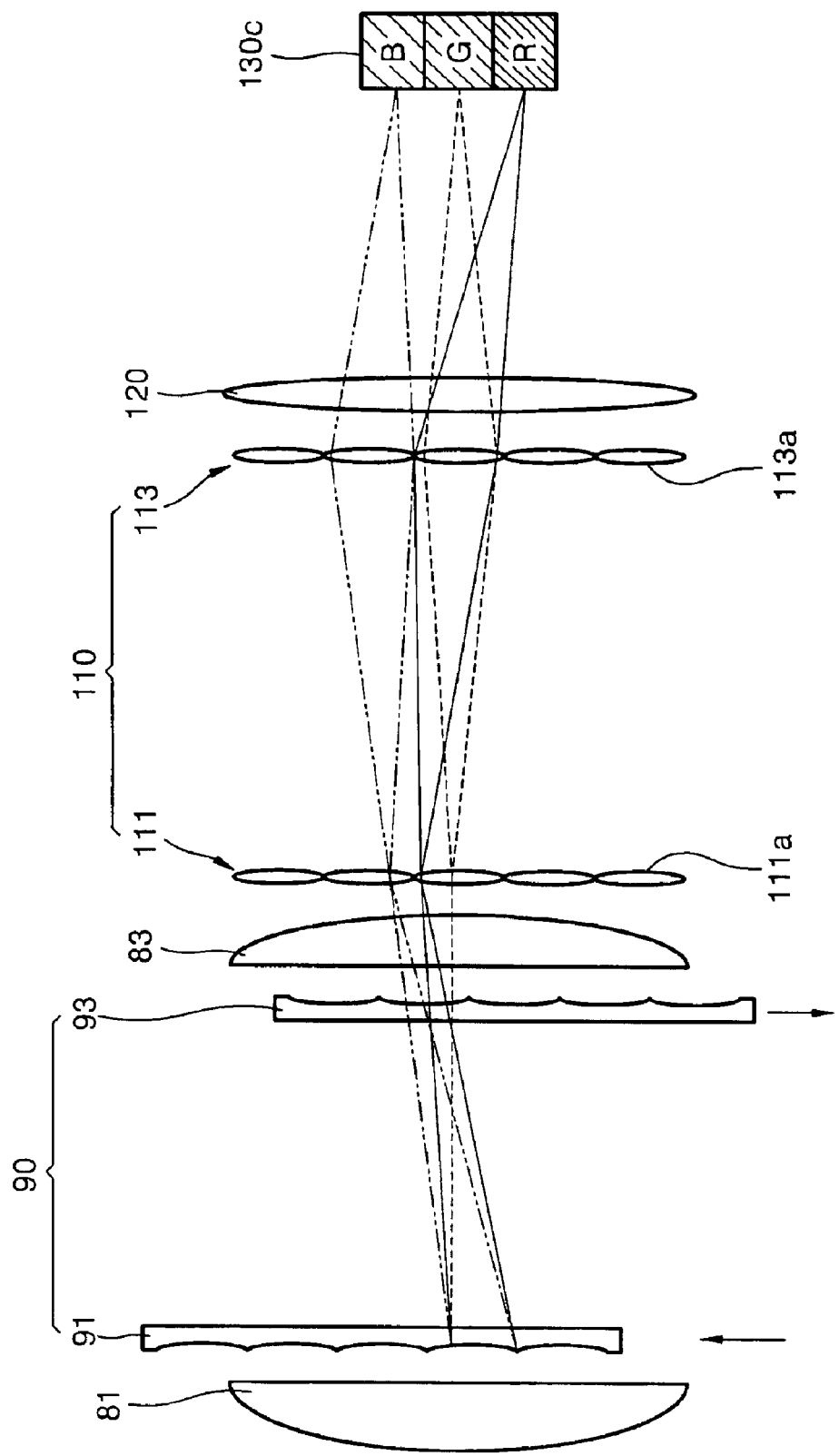

The operative method of the color lighting apparatus having the above-described structure will now be further described, with reference to FIG. 3, and as illustrated in FIGS. 6 through 8.

FIG. 6 illustrates an example of an embodiment of the first and second cylindrical array lenses 91 and 93, as oriented by driving the first and second driving units 100 and 100'. When the optical elements are disposed, as illustrated in FIG. 6, the color beams separated from the color separating unit 70 are condensed onto the first condensing lens 81, and the condensed beam is separated into several beams by the first cylindrical array lens 91. The separated beams pass through the second cylindrical array lens 93, the second condensing lens 83, the uniform light forming unit 110, and the relay lens 120, and thereby form color bars at the predetermined position. Here, the formed color bars are represented by reference numeral 130a, and the G, R, and B beams are disposed in a (G, R, B) ordering in the direction from the upper part to the lower part of the bars 130a, as shown in FIG. 6. Since the color beams separated from the color separating unit 70 are incident on the first condensing lens 81 at different angles and are transferred to their respective predetermined positions via different optical paths, formed by the above optical elements, i.e., the second cylindrical array lens 93, the second condensing lens 83, the uniform light forming unit 110, and the relay lens 120, it is possible to separate the incident light into the color beams.

It is preferable that the total focal length of the first and second condensing lenses 81 and 83, and the first and second cylindrical array lenses 91 and 93, is set such that the beam emitted from the second condensing lens 83 is focused onto the first fly eye lens 111 when the parallel beam is incident on the first condensing lens 81. The focal length is set according to the index of refraction of the above optical elements. Since a method for setting the focal length is known, a description thereof will be omitted.

FIG. 7 illustrates another example of arranging the first and second cylindrical array lenses 91 and 93 by driving the first and second driving units 100 and 100'. As an alternative to the embodiment illustrated in FIG. 6, the first cylindrical array lens 91 is disposed at a higher position than the second cylindrical array lens 93. The color bars, formed when the first and second cylindrical array lenses 91 and 93 are disposed as illustrated in FIG. 7, are represented by reference numeral 130b, with the R, B, and G beams being disposed in an (R, B, G) order, from the upper part to the lower part of the color bars 130b.

FIG. 8 illustrates yet another example of arranging the first and second cylindrical array lenses 91 and 93 by driving the first and second driving units 100 and 100'. As another alternative to the embodiments illustrated in FIGS. 6 and 7, as illustrated in FIG. 8, the first cylindrical array lens 91 can be disposed at an ever higher position than the second cylindrical array lens 93. That is, a difference in height between the first and second cylindrical array lenses 91 and 93, in FIG. 8, is greater than that in FIG. 7. In this case, the color bars, formed when the first and second cylindrical array lenses 91 and 93 are disposed as illustrated in FIG. 8, are represented by reference numeral 130c, with the B, G, and B beams being disposed in an (B, G, R) ordering, from the upper part to the lower part of the color bars 130c.

Thus, the scrolling of color bars 130a, 130b, and 130c are repeated by changing the arrangement of the first and second cylindrical array lenses 91 and 93 as shown in FIGS. 6 through 8 by driving the first and second driving units 100 and 100'.

Referring to FIG. 3, the image projection apparatus and method according to that embodiment of the present invention included the color lighting system, the image forming device 130 forming an image from the light exiting the uniform light forming unit 110, and a projection lens unit 140 magnifying and projecting the image, produced from the image forming device 130, onto a screen 150.

Here, the color lighting apparatus and method includes the light source 60 generating and emitting light, the color beam separating unit 70 separating the incident light according to the predetermined wavelength band, the first and second condensing lenses 81 and 83, the scrolling unit 90, and the uniform light forming unit 110. The structure, disposition, and function of the optical elements included in the color lighting system were described above, with reference to FIGS. 3 through 8.

The image forming device 130 is disposed at a position where the color bars are formed. The effective image area of the image forming device 130 is separated into the three areas, and the R, B, and G beams for forming the color bar are scrolled and are incident on the three areas.

The image forming device 130 may be transmission type liquid display. In this case, the transmission type liquid display functions as an optical valve and forms an image by selectively transmitting or blocking the incident light on each pixel.

The image forming device 130 may be a reflecting liquid crystal display or a micromirror device for making reflecting paths of light incident on each pixel different. In this case, the image projection system may further include a beam splitter (not shown), such that the image produced from the image forming device 130 proceeds to the screen 150. Since the structure and function of the image forming device 130 are widely known, a description thereof will be omitted.

The projection lens unit 140 is disposed between the image forming device 130 and the screen 150, and the image produced from the image forming device 130 is magnified and projected onto the screen 150.

Figure 9:
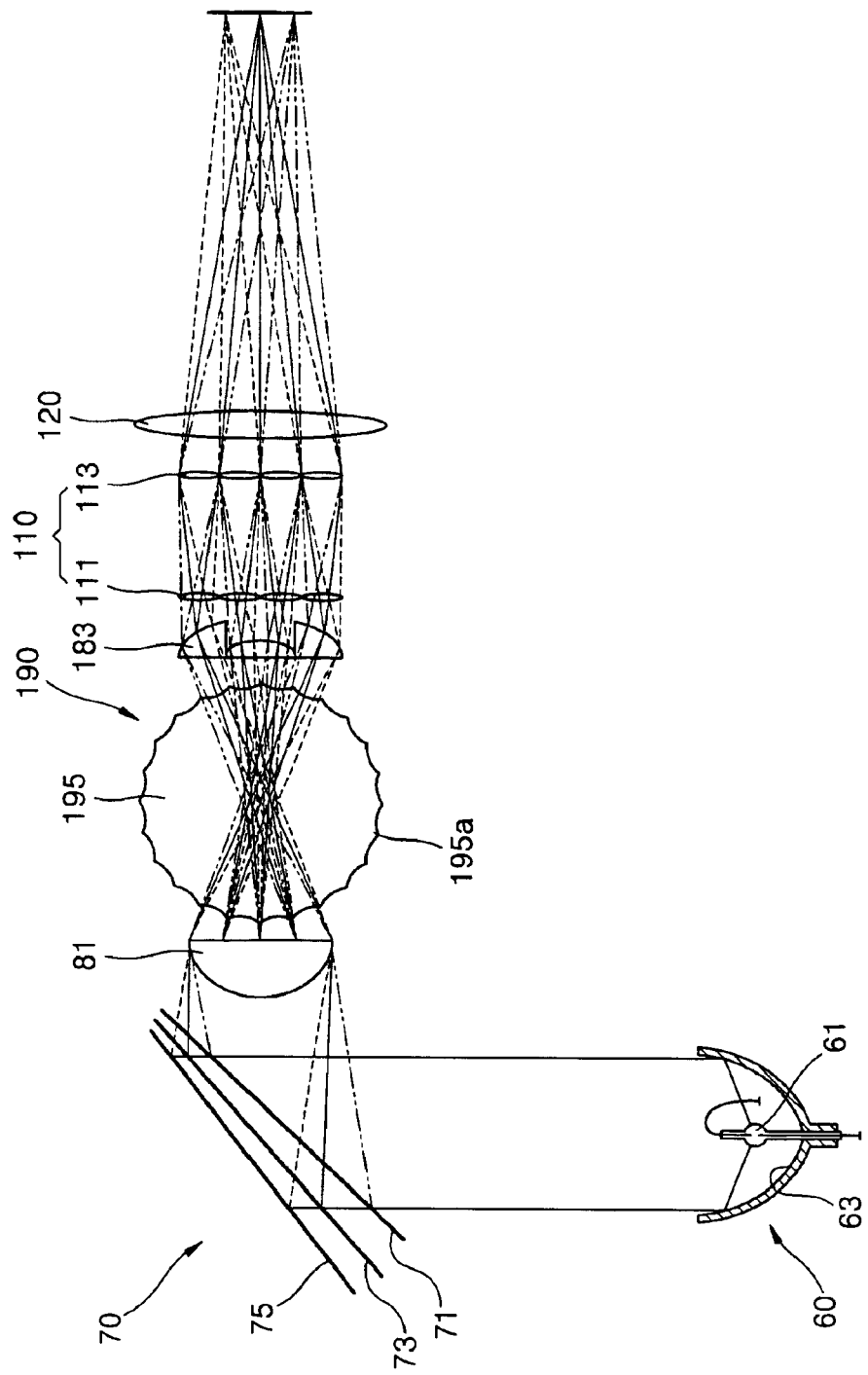
FIG. 9 schematically illustrates an optical arrangement of a color lighting apparatus and method, according to another embodiment of the present invention.

Referring to FIG. 9, a color lighting apparatus and method, according to another embodiment of the present invention includes a light source 60, a color beam separating unit 70, a first condensing lens 81, and a scrolling unit 190. Here, since the light source 60, the color beam separating unit 70, and the first focusing lens 81 use the same reference numerals as the embodiment illustrated in FIG. 3 and their structure and function are substantially the same as the FIG. 3 embodiment, their description will be omitted.

Figure 10:
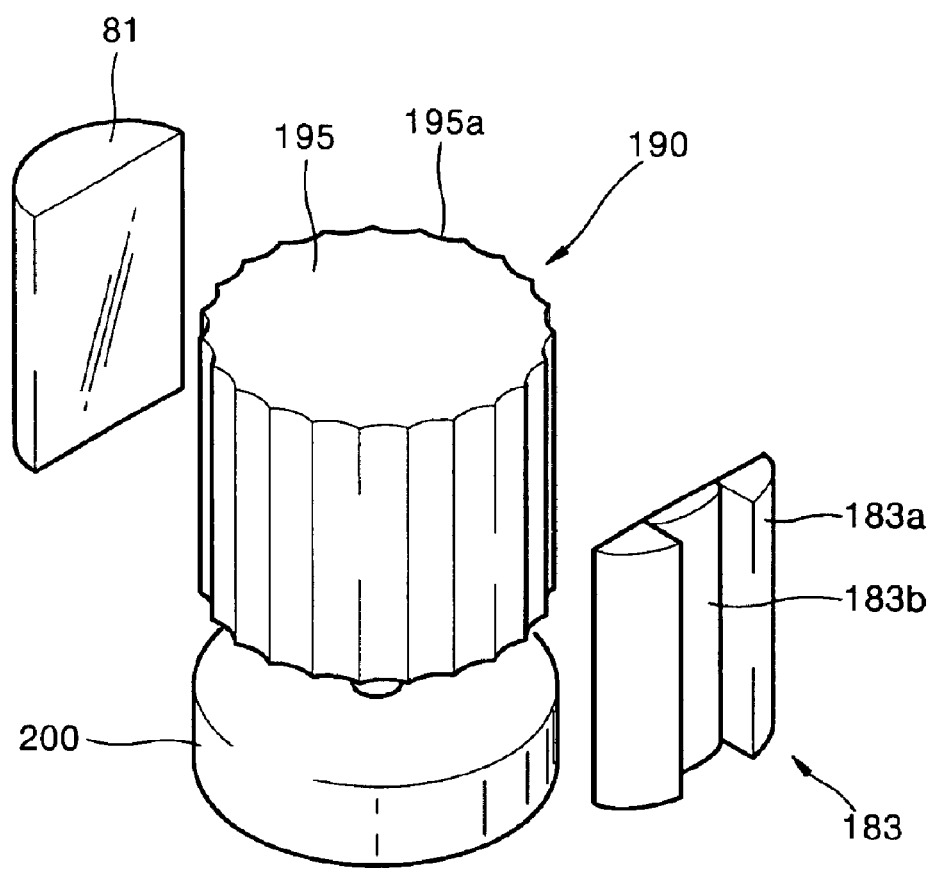
FIG. 10 is a schematic perspective view of elements of FIG. 9.

Another embodiment of the present invention is characterized in that the structure of the scrolling unit 190 can be changed, compared to the scrolling unit 190 of FIG. 3. Referring to FIGS. 9 and 10, the scrolling unit 190 includes a turning cylinder array lens 195, which is rotatably disposed on an optical path of the light and a driving unit 200, for rotatably driving the turning cylinder array lens 195.

The turning cylinder array lens 195 has a cylinder shape and includes a plurality of cylindrical lenses 195a, which have the same index of refraction and are adjacently disposed. The plurality of cylindrical lenses 195a independently converges or diverges the incident light. The cylindrical lenses 195a may be concave for diverging the incident light or may have a certain shape for converging or diverging the incident light by forming a refractive pattern on the flat panel.

Since the driving unit 200 is a general rotatable driving device such as a motor and the structure thereof is widely known, a description thereof will be omitted.

The scrolling unit 190 includes the turning cylinder array lens 195 in this embodiment, which is advantageous over other systems in that the color bars that are separately formed can be scrolled sequentially, unlike the scrolling unit 90 of the previous embodiment.

The color lighting system of this embodiment may include a second condensing lens 183, a uniform light forming unit 110, and a relay lens 120.

As illustrated in FIG. 10, the second condensing lens 183 is disposed to be opposing some of the plurality of cylindrical lenses 195a and have a semi-cylinder shape like the first condensing lens 81.

The second condensing lens 183 includes first areas 183a, which are disposed to be opposing the outside lenses among the plurality of cylindrical lenses 195a, and second areas 183b, which are disposed to be opposing the inside lenses among the plurality of cylindrical lenses 195a. The curvatures of the first areas 183a and the second areas 183b are different from each other. By having different curvatures, light passing through the first areas 183a and light passing though the second areas 183b are focused on the same plane.

The uniform light forming unit 110 is disposed along an optical path between the second condensing lens 183 and the relay lens 120. Since the optical structure of the uniform light forming unit 110 is substantially the same as that of the uniform light forming unit 110 of the color lighting system of the previous embodiment, a description thereof will be omitted.

Figure 11:
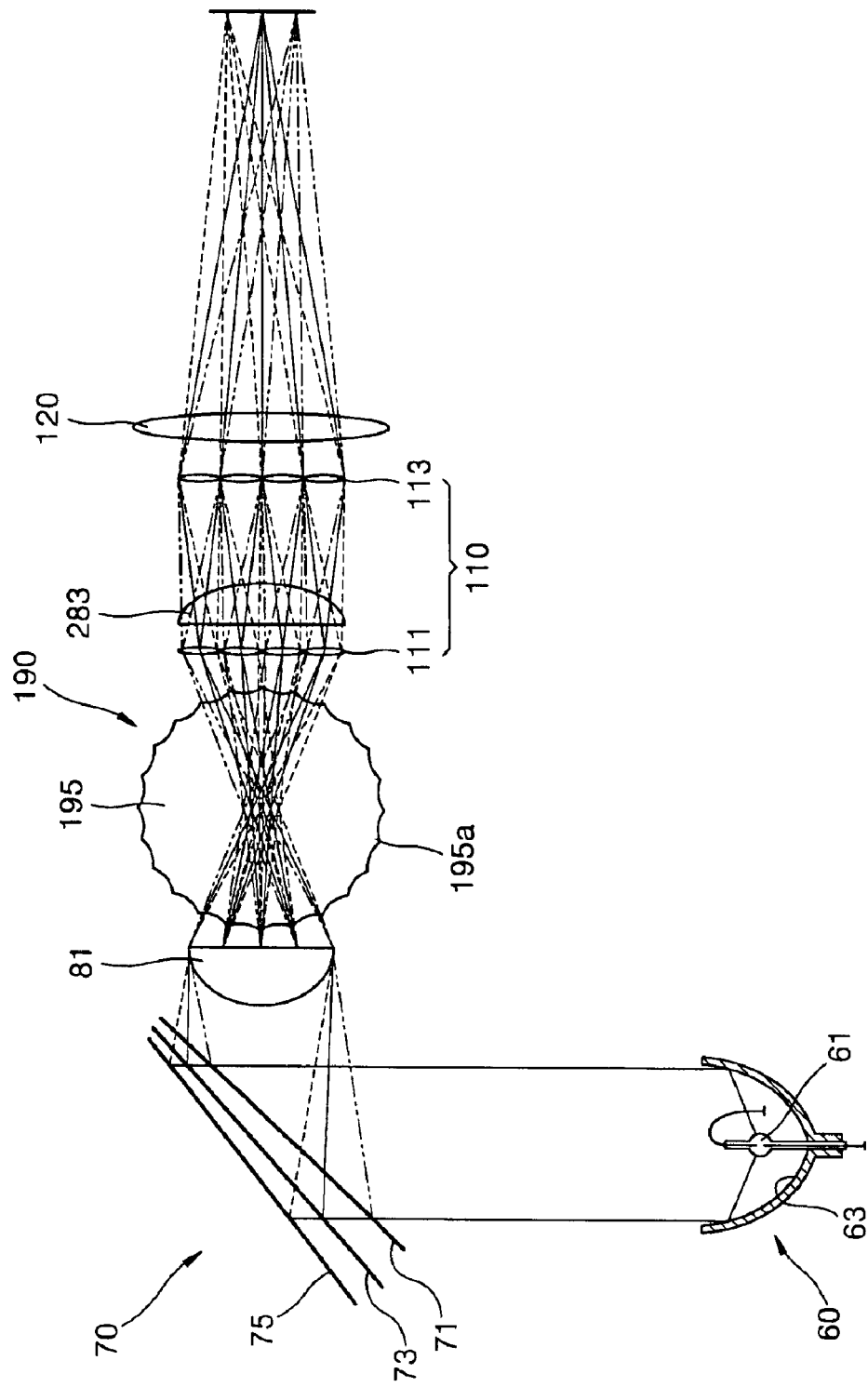
FIG. 11 schematically illustrates an optical arrangement of a color lighting apparatus and method, according to another embodiment of the present invention.

Referring to FIG. 11, a color lighting system according to another embodiment of the present invention includes a light source 60, a color beam separating unit 70, a first condensing lens 81, a scrolling unit 190, a second condensing lens 283, a uniform light forming unit 110, and a relay lens 120. Here, since the light source 60, the color beam separating unit 70, the first condensing lens 81, the scrolling unit 190 use the same reference numerals as the previous embodiment, with their structure and functions being substantially the same, their description will be omitted.

This additional embodiment is characterized in that the optical arrangement of the second condensing lens 283 is different from the other embodiments. Specifically, the second condensing lens 283 is disposed between a first fly eye lens 111 and a second fly eye lens 113, which are included in the uniform light forming unit 110.

An image projection system according to this embodiment of the present invention includes the color lighting system, an image forming device (not shown) forming an image from light exiting the uniform light forming unit 110, and a projection lens unit (not shown) magnifying and projecting the image produced from the image forming device onto a screen (not shown). The color lighting system image included in the image projection system of this embodiment is different from that of a previous embodiment in that the scrolling unit 190 includes a turning cylinder array lens 195. Since the structure, disposition, and function of the remaining optical elements, other than the turning cylinder array lens 195, are the same as those of a previous embodiment, their description will be omitted. That is, the scrolling unit 190 includes the turning cylinder array lens 195 and a driving unit for driving the turning cylinder array lens 195 so that the scrolling unit 190 scrolls color bars, with the image projection system being easily synchronized with the driving of the image forming device.

As described above, according to embodiments of the present invention, since a color lighting system includes a scrolling unit for illuminating color beams, its optical structure can be simple and light can be scrolled and illuminated, with low light loss.

Further, according to embodiments of the present invention, an image projection system can be easily synchronized with the driving of an image forming device when color bars are scrolled. In addition, since the image projection system is a single-panel type, the optical structure thereof can be simple. Since the image projection system scrolls incident light using first and second cylindrical array lenses or a turning cylindrical array lens, the optical efficiency thereof can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A color lighting system, comprising:
   a light source to emit light;
   a color beam separator separating incident light emitted from the light source according to predetermined wavelength bands and transmitting the separated beams at different angles;
   a first condensing lens condensing the separated beams; and
   a scrolling unit changing travel paths of the condensed beams in color bars at different locations, and scrolling the changing of the travel paths of the condensed beams so as to periodically scroll the color bars, and
   wherein the scrolling unit comprises;

a turning cylinder array lens, rotatably disposed along an optical path of light, incident on the scrolling unit, including a plurality of adjacently disposed cylindrical lenses, along an outer circumference portion of the turning cylinder array lens, having a cylinder shape; and a driving unit rotatably driving the turning cylinder array lens, and wherein the turning cylinder array lens is a diffraction optical element, forming the plurality of cylindrical lenses, using a diffraction pattern.

2. A color lighting system, comprising:

a light source to emit light;

a color beam separator separating incident light emitted from the light source according to predetermined wavelength bands and transmitting the separated beams at different angles;

a first condensing lens condensing the separated beams; and a scrolling unit changing travel paths of the condensed beams in color bars at different locations, and scrolling the changing of the travel paths of the condensed beams so as to periodically scroll the color bars, and wherein the color beam separator comprises:

a first dichroic mirror, inclined to the optical axis of light incident to the color beam separator, reflecting a first color beam of the incident light and transmitting the remaining color beams;

a second dichroic mirror, inclined to the optical axis of the incident light and disposed behind a back surface of the first dichroic mirror, reflecting a second color beam of the color beams transmitted by the first dichroic mirror, and transmitting the remaining color beam; and a third dichroic mirror, inclined to the optical axis of the incident light and disposed behind a back surface of the second dichroic mirror, and reflecting a third color beam of the color beams transmitted by the second dichroic mirror.

3. The color lighting system of claim 2, wherein the first, second, and third dichroic mirrors are inclined at different angles to the optical axis of the incident light, and the light exiting the first, second, and third dichroic mirrors is incident on the first condensing lens at different angles.

4. The color lighting system of claim 3, wherein the angle of inclination for the first dichroic mirror is less than the angle of inclination for the second dichroic which is less than the angle of inclination for the third dichroic mirror.

5. A color lighting system, comprising:

a light source to emit light;

a color beam separator separating incident light emitted from the light source according to predetermined wavelength bands and transmitting the separated beams at different angles;

a first condensing lens condensing the separated beams; and a scrolling unit changing travel paths of the condensed beams in color bars at different locations, and scrolling the changing of the travel paths of the condensed beams so as to periodically scroll the color bars, and wherein the first condensing lens is a diffraction optical element, having a predetermined diffraction pattern, so as to selectively condense light incident on the first condensing lens, only along particular incidence paths.

6. A color lighting system, comprising;

a light source to emit light;

a color beam separator separating incident light emitted from the light source according to predetermined wavelength bands and transmitting the separated beams at different angles;

a first condensing lens condensing the separated beams; and a scrolling unit changing travel paths of the condensed beams in color bars at different locations, and scrolling the changing of the travel paths of the condensed beams so as to periodically scroll the color bars, and wherein the scrolling unit comprises:

a first cylindrical array lens, including a plurality of adjacently disposed cylindrical lenses converging and diverging light, incident on the first cylindrical array lens, independently; and a first driving unit providing a driving force to scroll light exiting the first cylindrical array lens and reciprocatingly-drive the first cylindrical array lens in a direction perpendicular to an optical axis of the incident light; and wherein the first cylindrical array lens is driven by a first magnetic force.

7. The color lighting system of claim 6, wherein the scrolling unit further comprises:

a second cylindrical array lens, separated from the first cylindrical array lens, including a plurality of adjacently disposed cylindrical lenses converging or diverging light, incident on the second cylindrical array lens, independently; and a second driving unit providing a driving force to reciprocatingly-drive the second cylindrical array lens in a direction perpendicular to the optical axis of the light incident on the second cylindrical lens, and wherein the second cylindrical array lens is driven by a second magnetic force.

8. The color lighting system of claim 7, wherein each of the first and second cylindrical array lenses is a diffraction optical element, forming the plurality of cylindrical lenses using a diffraction pattern.

9. A color lighting system, comprising:

a light source to emit light;

a color beam separator separating incident light emitted from the light source according to predetermined wavelength bands and transmitting the separated beams at different angles;

a first condensing lens condensing the separated beams;

a scrolling unit changing travel paths of the condensed beams in color bars at different locations, and scrolling the changing of the travel paths of the condensed beams so as to periodically scroll the color bars; and a second condensing lens condensing the light exiting the scrolling unit; and a uniform light forming unit making the light exiting the scrolling unit uniform light.

10. The color lighting system of claim 9, wherein the second condensing lens is a cylindrical lens for selectively condensing incident light, incident on the second condensing lens, only along particular incidence paths.

11. The color lighting system of claim 9, wherein the second condensing lens is a diffraction optical element, having a predetermined diffraction pattern, for selectively condensing incident light, incident on the second condensing lens, only along particular incidence paths.

12. The color lighting system of claim 9, further comprising a relay lens transferring the light passing through the uniform light forming unit to a predetermined position.

13. The color lighting system of claim 9, wherein the uniform light forming unit comprises:
a first fly eye lens having a plurality of convex portions, two-dimensionally arranged on an incident surface and/or an emitting surface of the light uniform light forming unit; and
a second fly eye lens, disposed adjacent to the first fly eye lens, having a plurality of convex portions, two-dimensionally arranged on the incident surface and/or the emitting surface of the uniform light forming unit.

14. An image projection system, comprising:
a light source emitting light beams;
a color beam separator separating incident light beams, emitted from the light source, according to predetermined wavelength bands and transmitting the separated beam at different angles;
a first condensing lens condensing the separated beams;
a scrolling unit changing travel paths of the condensed beams to form color bars at different locations and scrolling the changing of the travel paths of the condensed beams so as to periodically scroll the color bars;
a second condensing lens condensing light exiting the scrolling unit;
a uniform light forming unit transforming the light exiting the scrolling unit into uniform light;
an image forming device forming an image from light exiting the uniform light forming unit; and
a projection lens unit magnifying and projecting the image produced from the image forming device onto a screen.

15. The image projection system of claim 14, wherein the scrolling unit comprises:
a turning cylinder array lens, rotatably disposed along an optical path of light incident on the scrolling unit, including a plurality of adjacently disposed cylindrical lenses, along an outer circumference portion of the turning cylinder array lens, having a cylinder shape; and
a driving unit rotatably driving the turning cylinder array lens.

16. The image projection system of claim 15, wherein the turning cylinder array lens is a diffraction optical element, forming the plurality of cylindrical lenses using a diffraction pattern.

17. The image projection system of claim 14, further comprising a relay lens transferring light passing through the uniform light forming unit to a predetermined position.

18. The image projection system of claim 14, wherein the uniform light forming unit comprises:
a first fly eye lens having a plurality of convex portions, two-dimensionally arranged on an incident surface and/or an emitting surface of the uniform light forming unit; and
a second fly eye lens, disposed adjacent to the first fly eye lens, having a plurality of convex portions, two-dimensionally arranged on the incident surface and/or the emitting surface of the uniform light forming unit.

19. The image projection system of claim 14, wherein the color beam separator comprises:
a first dichroic mirror, inclined to an optical axis of light incident on the color beam separator, reflecting a first color beam of the incident light and transmitting the remaining color beams;
a second dichroic mirror, inclined to the optical axis of the incident light and disposed behind a back surface of the first dichroic mirror, reflecting a second color beam of the color beams transmitted by the first dichroic mirror and transmitting the remaining color beam; and
a third dichroic mirror, inclined to the optical axis of the incident light and disposed behind a back surface of the second dichroic mirror, reflecting a third color beam of the color beams transmitted by the second dichroic mirror.

20. The image projection system of claim 19, wherein the first, second and third dichroic mirrors are inclined at different angles to the optical axis of the incident light, and light exiting the first, second, and third dichroic mirrors is incident on the first condensing lens at different angles.

21. The image projection system of claim 20, wherein the angle of inclination for the first dichroic mirror is less than the second angle of inclination for the second dichroic which is less than the angle of inclination for the third dichroic mirror.

22. The image projection system of claim 18, wherein the first and second condensing lenses are cylindrical lenses for selectively condensing respective incident light beams, incident on the corresponding condensing lens, only along particular incidence paths.

23. The image projection system of claim 18, wherein each of the first condensing lens and second condensing lenses are diffraction optical elements having predetermined diffractions pattern so as for selectively condensing respective incident light beams, incident on the corresponding condensing lens, only along particular incidence paths.

24. The image projection system of claim 18, wherein the scrolling unit comprises:
a first cylindrical array lens, including a plurality of adjacently disposed cylindrical lenses converging or diverging light, incident on the first cylindrical array lens, independently; and
a first driving unit providing a driving force for scrolling light exiting the first cylindrical array lens and for reciprocatingly-driving the first cylindrical array lens in a direction perpendicular to an optical axis of the incident light.

25. The image projection system of claim 24, wherein the scrolling unit further comprising:
a second cylindrical array lens, separated from the first cylindrical array lens, including a plurality of adjacently disposed cylindrical lenses converging and diverging light, incident on the second cylindrical array lens, independently; and
a second driving unit providing a driving force reciprocatingly-driving the second cylindrical array lens in a direction perpendicular to an optical axis of the light incident on the second cylindrical array lens.

26. The image projection system of claim 25, wherein each of the first and second cylindrical array lenses is a diffraction optical element having a predetermined diffraction pattern.

27. The image projection system of claim 14, wherein the predetermined wavelength bands consist of three separate predetermined wavelength bands for three separate colors.

* * * * *

UNITED STATES PATENT AND TRADEMARK OFFICE
CERTIFICATE OF CORRECTION

| | | |
|---|---|---|
| PATENT NO. | : 6,961,192 B1 | Page 1 of 1 |
| APPLICATION NO. | : 10/720340 | |
| DATED | : November 1, 2005 | |
| INVENTOR(S) | : Sung-Ha Kim et al. | |

It is certified that error appears in the above-identified patent and that said Letters Patent is hereby corrected as shown below:

On the Title Page, Column 1, line 2 (75) Inventors, replace "Gyeonggi do" with --Gyeonggi-do--, therefor;

Column 1, line 2 (75) Inventors, replace "He-jong Lee", with --He-joong Lee--, therefor;

Column 14, line 23, Claim 22, replace "claim 18" with --claim 14--, therefor;

Column 14, line 30, Claim 23, replace "claim 18" with --claim 14--, therefor;

Column 14, line 36, Claim 24, replace "claim 18" with --claim 14--, therefor.

Signed and Sealed this

Twenty-eighth Day of November, 2006

JON W. DUDAS
*Director of the United States Patent and Trademark Office*